(12) United States Patent
Morimoto et al.

(10) Patent No.: US 6,373,206 B1
(45) Date of Patent: Apr. 16, 2002

(54) MOTOR DRIVE CONTROL APPARATUS

(75) Inventors: Kazuhiko Morimoto; Yoshiaki Omata, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/539,424

(22) Filed: Mar. 30, 2000

(30) Foreign Application Priority Data

Mar. 31, 1999 (JP) .............................. 11-092618

(51) Int. Cl.$^7$ .............................. H02P 1/00; H02P 3/00; H02P 5/00
(52) U.S. Cl. ...................... 318/139; 318/143; 318/146; 318/157; 123/179.1; 290/27; 290/28; 290/36 R
(58) Field of Search ................................ 318/139–148, 318/151–153, 157; 310/75 R, 76–77, 98; 123/179.1, 179.3, 179.4; 290/17, 21, 24–25, 27–28, 36 R, 37 R, 37 A, 38 R, 40 R; 180/65.4

(56) References Cited

U.S. PATENT DOCUMENTS

| | | | |
|---|---|---|---|
| 4,531,491 A | 7/1985 | Iiyama et al. | |
| 4,589,071 A | 5/1986 | Yamamuro et al. | |
| 4,653,621 A | 3/1987 | Oshiage | |
| 5,172,784 A | 12/1992 | Varela, Jr. | |
| 5,343,970 A | 9/1994 | Severinsky | |
| 5,495,906 A | 3/1996 | Furutani | |
| 5,632,238 A | * 5/1997 | Furukawa et al. | 123/179.3 |
| 5,698,905 A | 12/1997 | Rüthlein | |
| 5,751,137 A | 5/1998 | Kiuchi et al. | |
| 5,757,153 A | 5/1998 | Ito et al. | |
| 5,762,156 A | 6/1998 | Bates et al. | |
| 5,771,478 A | 6/1998 | Tsukamoto et al. | |
| 5,839,533 A | 11/1998 | Mikami et al. | |
| 5,841,201 A | 11/1998 | Tabata et al. | |
| 5,895,333 A | 4/1999 | Morisawa et al. | |
| 5,898,282 A | 4/1999 | Drozdz et al. | |
| 5,927,415 A | 7/1999 | Ibaraki et al. | |
| 5,935,040 A | 8/1999 | Tabata et al. | |
| 5,941,796 A | 8/1999 | Lee | |
| 5,960,897 A | * 10/1999 | Furuya et al. | 180/65.4 |
| 6,018,199 A | * 1/2000 | Shiroyama et al. | 290/37 A |
| 6,032,753 A | 3/2000 | Yamazaki et al. | |
| 6,054,776 A | * 4/2000 | Sumi | 290/17 |
| 6,110,066 A | 8/2000 | Nedungadi et al. | |
| 6,114,775 A | * 9/2000 | Chung et al. | 318/139 |
| 6,116,364 A | 9/2000 | Taguchi et al. | |

FOREIGN PATENT DOCUMENTS

| | | |
|---|---|---|
| EP | 0 460 850 | 12/1991 |
| JP | 5-61432 | 8/1993 |
| JP | 5-72544 | 10/1993 |
| JP | 10136508 A | 5/1998 |
| JP | 10169535 A | 6/1998 |
| JP | 2000-13911 | 1/2000 |

* cited by examiner

Primary Examiner—Marlon T. Fletcher
(74) Attorney, Agent, or Firm—Flynn, Thiel, Boutell & Tanis, P.C.

(57) ABSTRACT

An electrical motor having a drive function and a power generating function is directly connected to an engine mounted on a vehicle. The vehicle has a starter connected to the engine. A motor control means for controlling the drive of the motor in cooperation with driving the starter and in accordance with an operating state of the engine in starting the engine to ensure firm starting performance of the engine, to promote durability of a starter and to simplify control of a motor to thereby promote durability of the control of the motor.

16 Claims, 9 Drawing Sheets

FIG.10

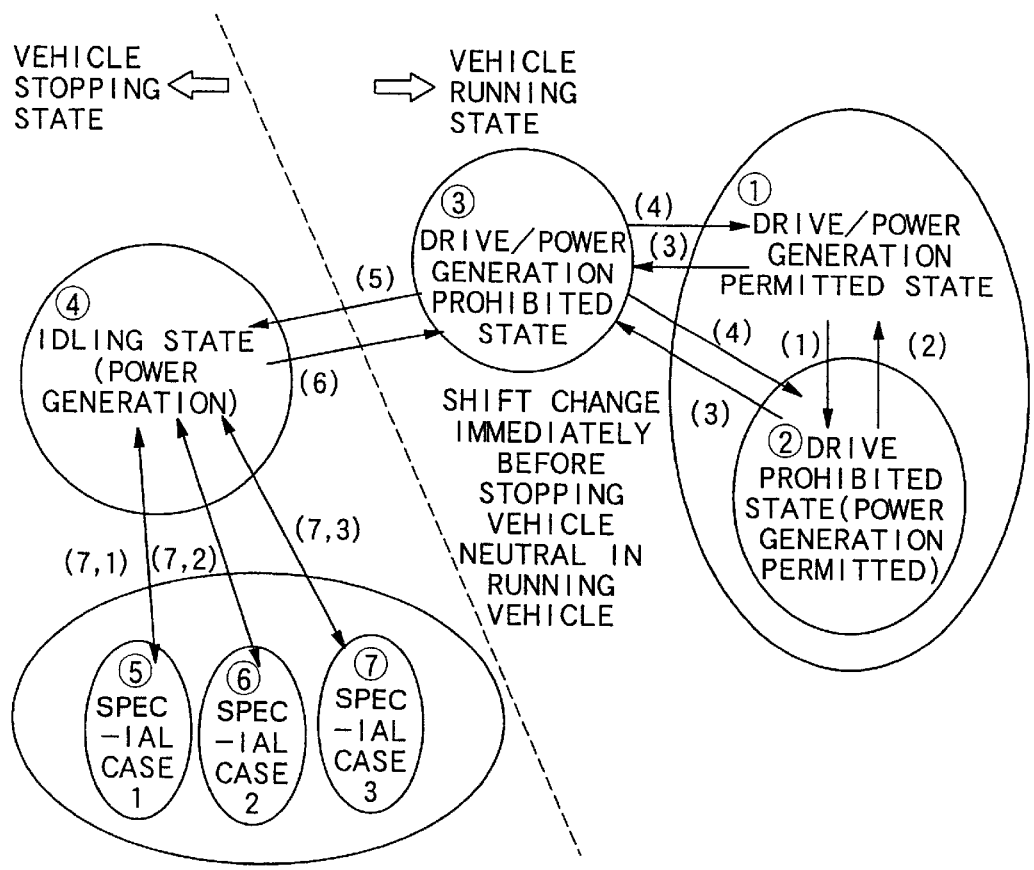

① DRIVE/POWER GENERATION PERMITTED:DRIVE/POWER GENERATION CONTROL

② DRIVE PROHIBITED(POWER GENERATION PERMITTED): POWER GENERATION CONTROL(VEHICLE RUNNING)

③ DRIVE/POWER GENERATION PROHIBITED:MOTOR CONTROL PROHIBITED

---

④ IDLING:POWER GENERATION CONTROL

⑤ SPECIAL CASE 1(VEHICLE STARTING STATE): DRIVING CONTROL

⑥ SPECIAL CASE 2(ENGINE STARTING STATE):DRIVING CONTROL (VEHICLE STATIONARY)

⑦ SPECIAL CASE 3(IDLING STABILIZING CONTROL STATE): DRIVING CONTROL

MOTOR DRIVE CONTROL APPARATUS

FIELD OF THE INVENTION

The present invention relates to a motor drive control apparatus in a vehicle, particularly to a motor drive control apparatus capable of ensuring firm starting performance of an engine, capable of promoting durability of a starter, capable of simplifying control of a motor and capable of increasing reliability of the control of the motor.

BACKGROUND OF THE INVENTION

As a kind of vehicles, there is a so-to-speak hybrid vehicle mounted with an internal combustion engine and an electric motor as power sources for propelling the vehicle. This kind of vehicle achieves requested functions (reduced fuel cost, reduced poisonous component values of emission, adequate power function) at higher levels by providing engine control means and motor control means for controlling operating states of the engine and the motor, respectively detecting the operating states of the engine and the motor, exchanging detected operational data of the engine and the motor between the engine control means and the motor control means and controlling the operating states of the engine and the motor in relation to each other.

There are disclosed such a vehicle motor control apparatus in Japanese Utility Model Laid-Open No. 61432/1993 and Japanese Utility Model Laid-Open No. 72544/1993.

According to the vehicle motor control apparatus disclosed in Japanese Utility Model Laid-Open No. 61432/1993, in a hybrid engine in which a rotating machine having functions of power generation and electrical drive is connected in parallel with a drive system of an internal combustion engine. There are provided power generation control means and electrical drive control means for controlling the rotating machine. The electrical drive control means is provided with electrical drive mode control means for setting a drive assist amount by a predetermined time period in the case of low temperatures and engine load setting means for setting power of the engine for supplementing power deficient in the drive assist amount.

According to the vehicle motor control apparatus disclosed in Japanese Utility Model Laid-Open No. 72544/1993, an engine of a mobile work vehicle is integrated with an induction machine provided with a motor function and a power generation function. The vehicle is further provided with control means for supplying torque from the induction machine to the engine when output torque of the engine is large, and generating electricity by the induction machine with the extra torque and charging electricity to a battery when the output torque of the engine is small.

Further, there is a vehicle motor control apparatus for controlling the drive of a motor in accordance with driving a starter connected to an engine. There are disclosed vehicle motor control apparatus of this kind in Japanese Patent Laid-Open No. 136508/1998 and Japanese Patent Laid-Open No. 169535/1998.

According to the vehicle motor control apparatus disclosed in Japanese Patent Laid-Open No. 136508/1998, in a hybrid vehicle provided with an engine and an electrically-driven motor as power sources and provided with a starter for starting the engine, normally, the engine is cranked to start by the electrically-driven motor. When the engine cannot be started by the electrically-driven motor, the engine is started by the starter. Further, the engine is cranked to start by the starter and the cranking operation is assisted by the electrically-driven motor as required.

According to the vehicle motor control apparatus disclosed in Japanese Patent Laid-Open No. 169535/1998, a cranking time period or a rotational number of stopping to crank an engine and the number of times of restarting the engine are determined based on water temperature of the engine, starting conditions are determined in accordance with the state of the engine and a starter is controlled in compliance with the starting conditions.

Meanwhile, according to the conventional motor control apparatus provided with the starter connected to the engine of a so-to-speak hybrid vehicle for controlling to drive the motor in accordance with driving the starter, as disclosed in Japanese Patent Laid-Open No. 136508/1998, mentioned above, the engine is cranked to start by the starter and the cranking operation is assisted by the electrically driven motor as required.

However, according to the conventional motor control apparatus, in cranking to start the engine by the starter, the electrically-driven motor is driven as required and therefore, there is a drawback in which firm starting performance of the engine is difficult to be ensured.

Further, according to the motor control apparatus, there is brought about a state in which the starter is driven without being assisted by the electrically-driven motor since the electrically-driven motor is driven as required in starting the engine. Under such a state, the whole load in the cranking operation is borne by the starter and accordingly, there is a drawback of reduced starter durability.

Further, the motor control apparatus carries out a control of driving the electrically-driven motor as required. Accordingly, the control means needs to include a function of determining or selecting assist conditions. This introduces a drawback of complicated control.

SUMMARY OF THE INVENTION

Hence, in order to remove the above-described drawbacks, the present invention provides a motor having a drive function and a power generating function directly connected to an engine mounted on a vehicle, a starter for starting connected to the engine, and motor control means for controlling the drive of the motor in cooperation with driving the starter and in accordance with an operating state of the engine when starting the engine.

The motor drive control apparatus according to the present invention can always assist the cranking operation of the starter by driving the motor in starting the engine by controlling the motor in cooperation with driving the starter and in accordance with the operating state of the engine. The motor control means assisting in starting the engine can make the motor bear a portion of load in the cranking operation without making the starter bear the whole load. The motor control means assists the cranking operation by constantly driving the motor in cooperation with driving the starter in starting the engine. Accordingly, there is no need of adding a function of determination, selection, or the like of assist conditions.

BRIEF DESCRIPTION OF THE DRAWINGS

FIG. 10 is a diagram showing transition of control in accordance with voltage of a main battery.

DETAILED DESCRIPTION

Figure 1:
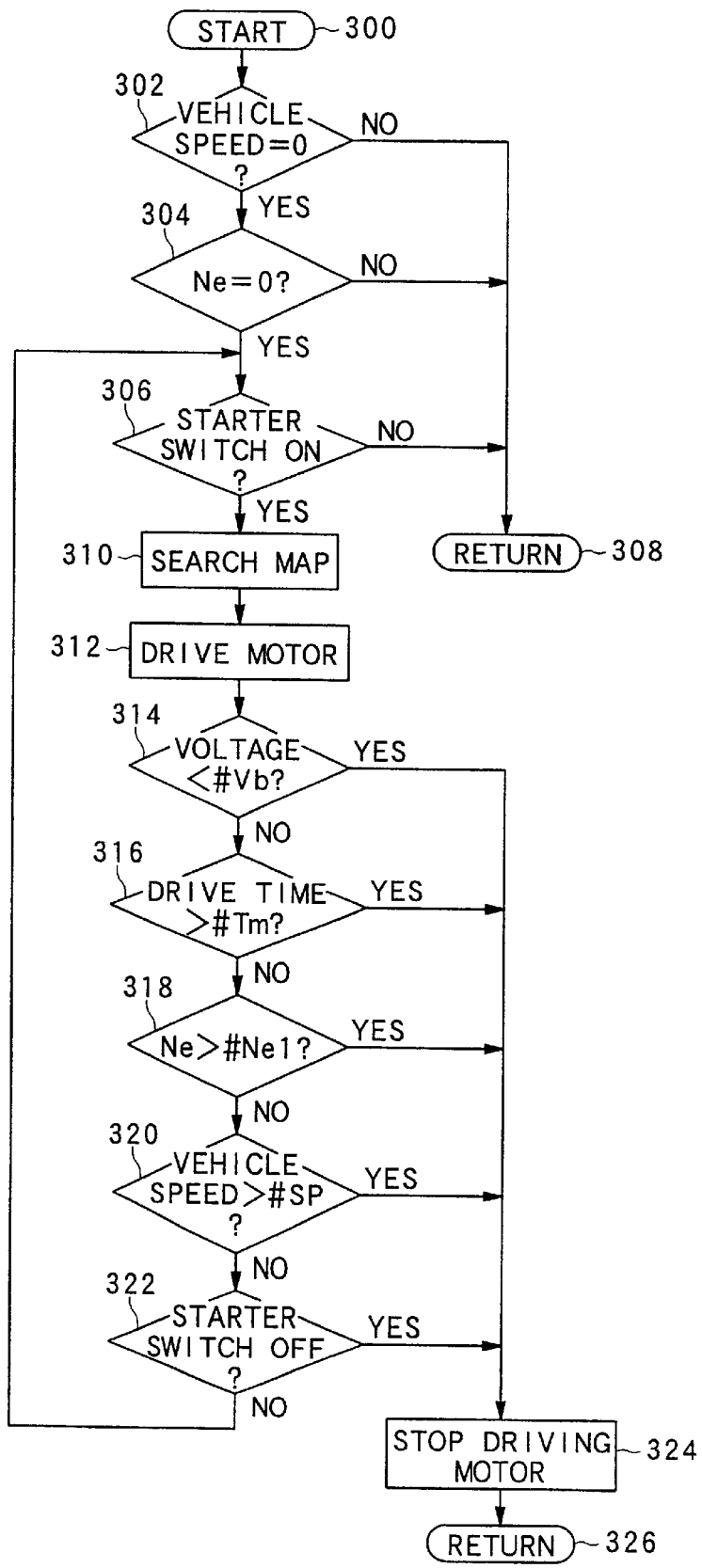
FIG. 1 is a control flowchart in starting a motor drive control apparatus showing an embodiment according to the invention.

An explanation will be given of embodiments according to the invention in reference to the drawings as follows. FIG. 1 through FIG. 10 show embodiments according to the invention. In FIG. 4, numeral 2 designates an engine mounted on a vehicle (not illustrated), numeral 4 designates a clutch and numeral 6 designates a manual transmission. The engine 2 is provided to directly connect with an electrical motor 8 having a vehicle driving function and an electrical power generating function.

Figure 5:
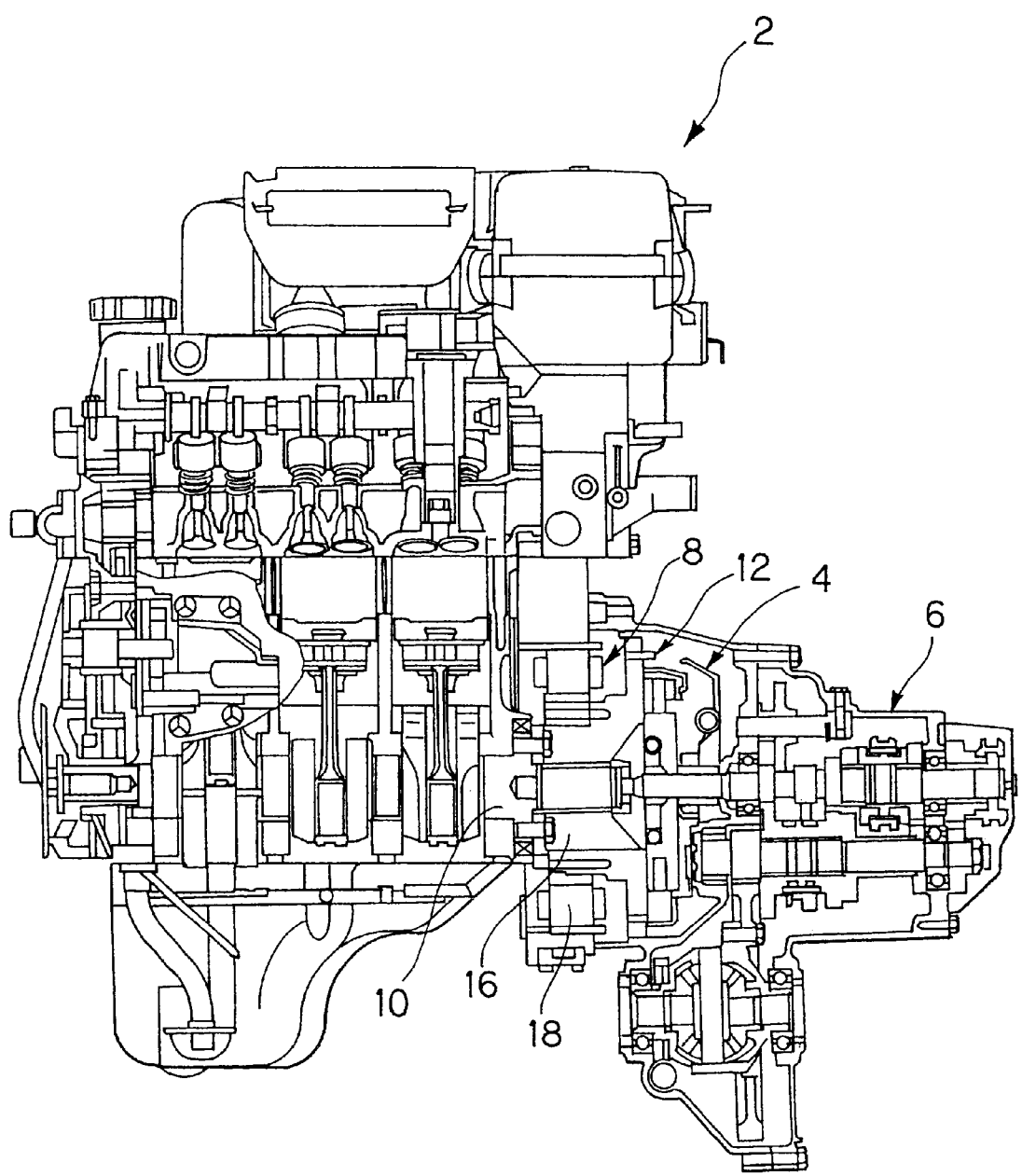
FIG. 5 is a sectional view of an engine directly connected with a motor on a flywheel side thereof.
Figure 6:
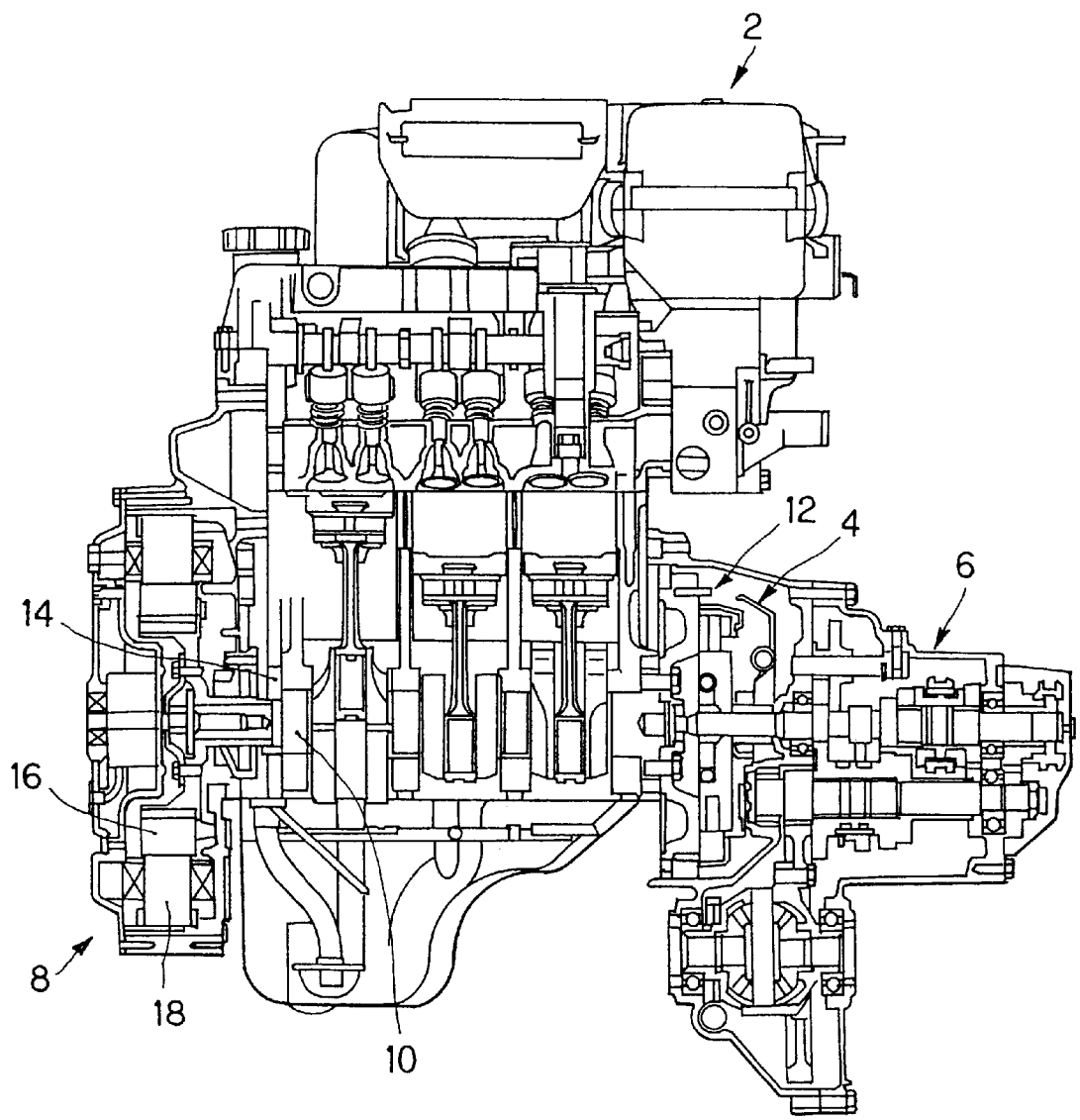
FIG. 6 is a sectional view of an engine directly connected with a motor on a crank sprocket side thereof.

According to the embodiment, as shown in FIG. 5, there is provided the motor 8 directly connected to a side of a flywheel 12 of a crank shaft 10 of the engine 2. Further, as shown in FIG. 6, there may be provided the motor 8 directly connected to a side of a crank sprocket 14 of the crank shaft 10 of the engine 2. The motor 8 is provided with a rotor 16 and a stator coil 18.

Referring again to FIG. 4, the engine 2 is provided with an alternator 20 for electrical power generation, an air compressor 22 for an air conditioner, a starter 22 for starting the engine, and an electrically-driven water pump 26 for a sub radiator 24. The alternator 20 and the air compressor 22 are connected to the crank shaft 10 by pulleys and belts (not illustrated). The starter 22 is connected to the flywheel 12 by engageable and disengageable pinion and ring gear (not illustrated).

An operating state of the engine 2 is controlled by engine control means 28. The engine control means 28 can be an electrical decision making device, for example an integrated circuit, computer, programmable logic controller, etc. Further, a drive state and a power generating state of motor 10 are controlled by motor control means 32 of a motor drive control apparatus 30. The motor control means 32 can be an electrical decision making device, for example an integrated circuit, computer, programmable logic controller, etc.

The engine 2 is connected to the engine control means 28 by a bi-directional signal line 34 for engine control. The engine control means 28 is connected to and powered by a sub-battery 38 by a power line 36 for engine control means. In this specification, line may mean an electrical signal conduit. The sub-battery 38 is connected to the alternator 20 by a power line 40 for charging the sub-battery and is connected to the starter 22 and the electrically-driven water pump 26 by a power line 42 for driving same. The sub-battery 38 is charged by the alternator 20 and supplies drive power to the starter 22 and the electrically-driven water pump 26.

The motor 8 is connected to the motor control means 32 by a signal line 44 for motor control. The motor control means 32 is connected to the sub-battery 38 by a power line 46 for motor control means and is connected to a main battery 50 by a main power line 48 for motor control means.

The main battery 50 supplies drive power to the motor 8 and is charged by power generated by the motor 8.

Figure 7:
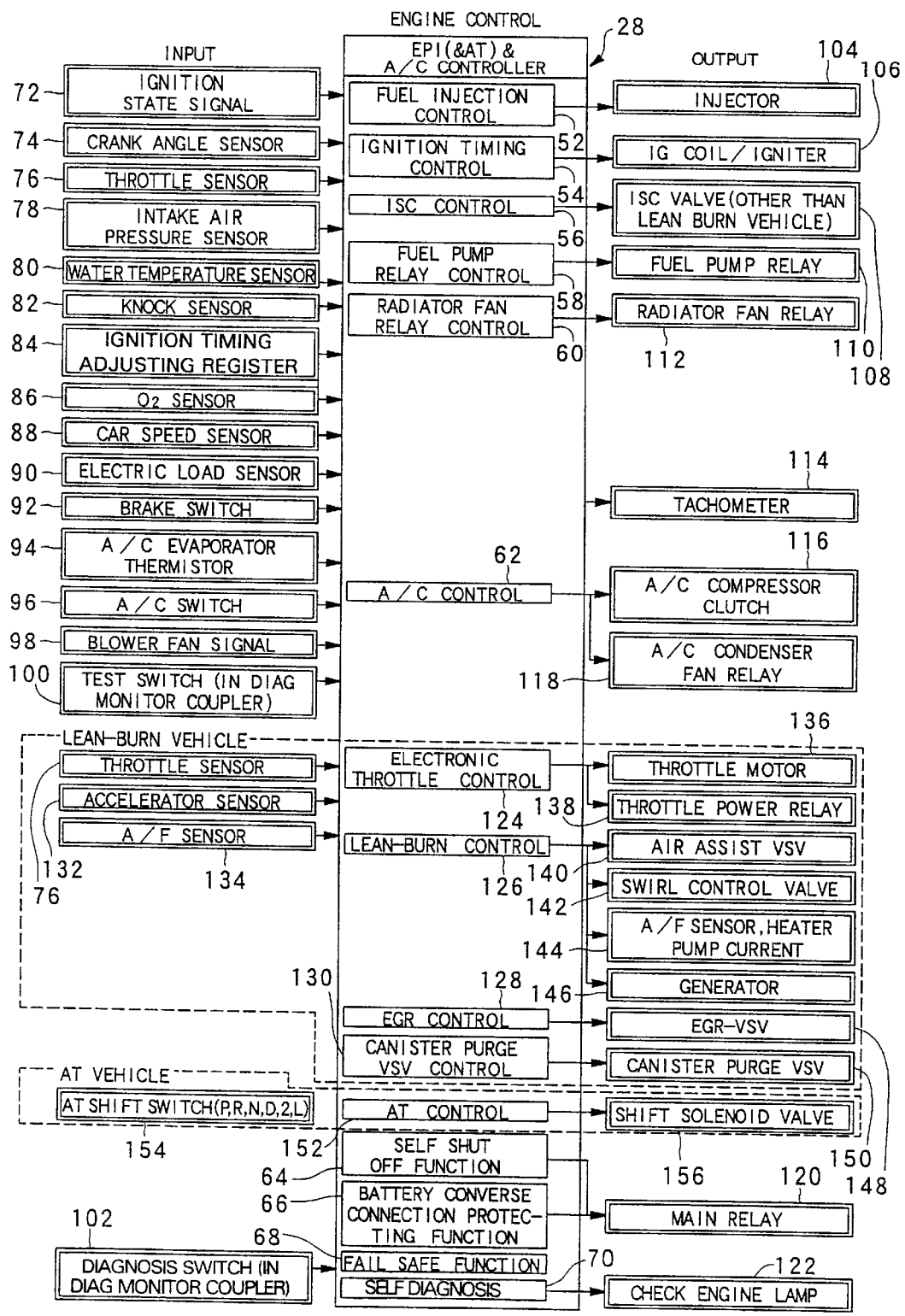
FIG. 7 is a diagram of engine control means.

As shown in FIG. 7, the engine control means 28 includes a fuel injection control unit 52, an ignition timing control unit 54, an idle speed control (ISC) unit 56, a fuel pump relay control unit 58, a radiator fan relay control unit 60, an air conditioner (A/C) control unit 62, a self shutoff function unit 64, a sub-battery inverse contact (polarity) protection function unit 66, a failsafe function unit 68 and a self diagnosis unit 70.

An input side of the engine control means 28 is provided to connect with an ignition switch 72, a crank angle sensor 74, a throttle sensor 76, an intake pressure sensor 78, a water temperature sensor 80, an engine knock sensor 82, an ignition timing adjusting register 84, an $O_2$ sensor 86, a vehicle speed sensor 88, an electric load sensor 90, a brake switch 92, an A/C evaporator thermistor 94, an A/C switch 96, a blower fan 98, a test switch 100 and a diagnosis switch 102.

An output side of the engine control means 28 is connected with an injector 104, an ignition coil/ignitor 106, an ISC valve 108, a fuel pump relay 110, a radiator fan relay 112, a tachometer 114, an A/C compressor clutch 116, an A/C condenser fan relay 118, a main relay 120 and a check engine lamp 122.

Further, the engine control means 28 is provided with an electronic throttle control unit 124, a lean burn control unit 126, an exhaust gas recirculation (EGR) control unit 128 and a canister purge valve control unit 130 enclosed by broken line when the engine is a lean burn (lean combustion) engine. In this case, the input side of the engine control means 28 is connected with an accelerator sensor 132 and an air/fuel (A/F) sensor 134 in addition to the throttle sensor 76. Further in this case, the output side of the engine control means 28 is provided to connect with a throttle motor 136, a throttle power relay 138, an air assist valve 140, a swirl control valve 142, an A/F sensor heater and pump 144, a generator 146, an EGR valve 148 and a canister purge valve 150.

Further, the engine control means 28 is provided with an AT control unit 152 as shown by broken lines when the transmission is an automatic transmission. In this case, the input side of the engine control means 28 connects with an AT shift switch 154 and the output side of the engine control means 22 is provided to connect with a shift solenoid valve 156.

The engine control means 28 drives the injector 104, the ignition coil/ignitor 106 and the like by signals inputted from the crank angle sensor 74, the throttle sensor 76 and the like, and controls operating states of a fuel injection amount, an ignition timing and the like of the engine 2.

Figure 8:
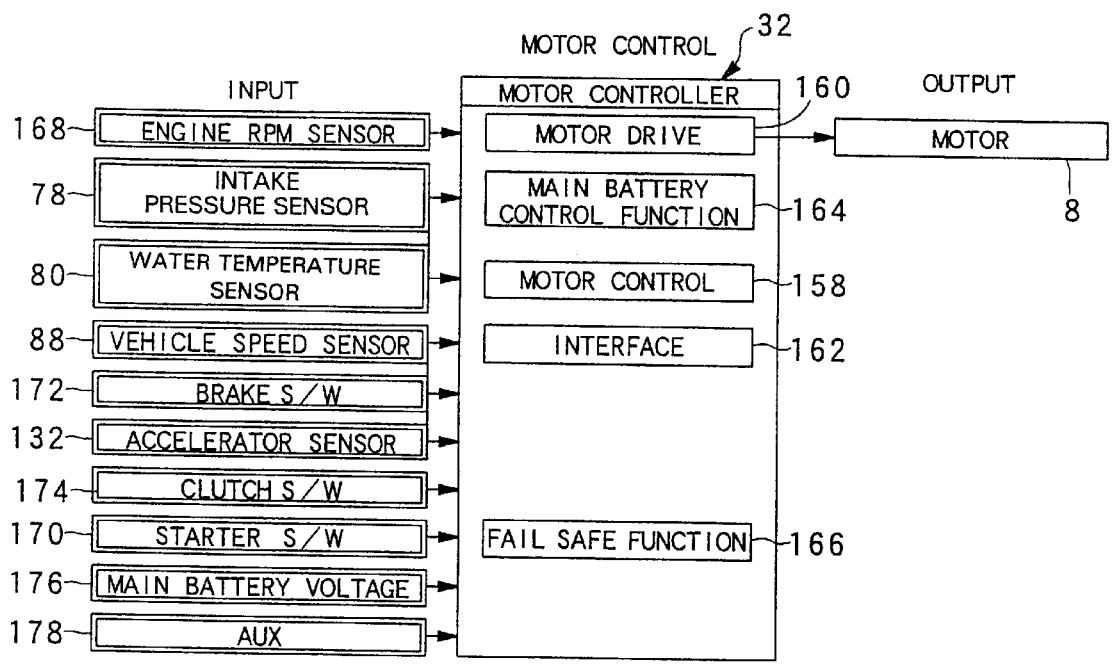
FIG. 8 is a diagram of motor control means.

As illustrated in FIG. 8, the motor control means 32 of the motor drive control apparatus 30 for controlling the motor 10 is provided with a motor control unit 158, a motor drive unit 160, an input/output processing unit (interface) 162, a main battery state control unit 164 and a failsafe unit 166.

The input side of the motor control means 32 is provided to connect with an engine rotational number (e.g. rpm) sensor 168, a starter switch 170, a brake switch 172, a clutch switch 174, a main battery voltage detector 176 and an auxiliary input (AUX) 178 in addition to the intake pressure sensor 78, the water temperature sensor 80, the vehicle speed sensor 88 and the accelerator sensor 132. The output side of the motor control means 32 connects to the motor 8.

The motor control means 32 does not exchange data with the engine control means 28, is independent from the control of the engine 4 by the engine control means 28, and independently determines and controls the drive state and the power generating state of the motor 8 based on the operating state of the engine 2 and the operating state of the vehicle.

As shown in FIG. 10, the motor control means 32 controls to proceed by way of a drive/power generation prohibited control state for forbidding driving and power generation of the motor 8 in transitioning between a stationary vehicle control state and a running vehicle control state which are set as control states based on the operating state of the vehicle.

Further, the motor control means 32 controls to input a main battery voltage signal from the main battery voltage detector 176 for detecting main battery voltage of the main battery 50 and to administer a main battery state based on the main battery voltage by the main battery state control unit 164.

Further, as shown in FIG. 10, the motor control means 32 charges the main battery 50 by the motor 8 generating electricity in a power generation control state for idling determined as the stationary vehicle control state, assists in starting the vehicle by driving the motor 8 in a drive control state for starting, assists starting the engine 2 by driving the motor 8 in a drive control state for starting, and stabilizes idling of the engine 2 by driving the motor 8 in a drive control state for stabilizing idling.

Further, as shown in FIG. 10, the motor control means 32 permits driving and power generation of the motor 8 in a drive/power generation permitted control state set as the running vehicle control state, prohibits driving of the motor 8 in a drive prohibited control state, prohibits driving and power generation of the motor 8 in a drive/power generation prohibited control state.

The transition is carried out between the drive/power generation permitted control state set as the running vehicle control state and the drive prohibited control state based on the main battery voltage of the main battery 50 controlled by the main battery state control unit 164 of the motor control means 32.

The motor control means 32 permits driving and power generation of the motor 8 in accordance with the drive/power generation permitted control state from a charged state (SOC) 100% of the main battery voltage and transitions to the drive prohibited control state when the main battery voltage is less than a lower limit of drive prohibition determining voltage. The motor control means 32 prohibits driving of the motor 8 in the drive prohibited control state, permits power generation until the main battery voltage reaches drive/power generation permission determining voltage, and transitions to the drive/power generation permitted control state and permit driving and power generation of the motor 8 when the main battery voltage exceeds the drive/power generation permission determining voltage.

The transition from the drive/power generation permitted control state to the drive prohibited control state is carried out when transition conditions set by a duration time period of the drive prohibition determining voltage with regard to the main battery voltage and the like are established. Further, the transition from the drive prohibited control state to the drive/power generation permitted control state is carried out when transition conditions of the drive/power generation permission determining voltage with regard to the main battery voltage and the like are established for a set time period.

Figure 2:
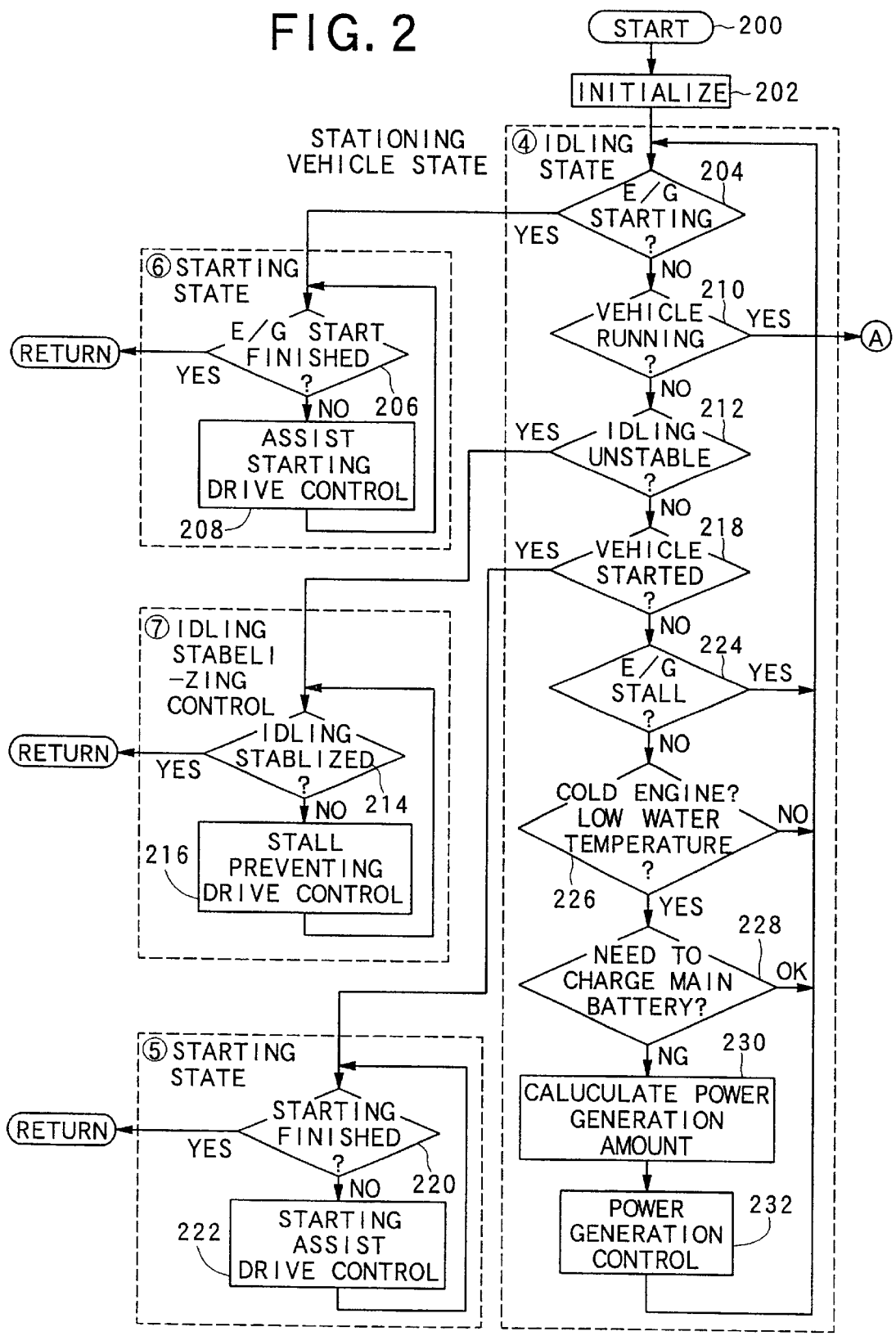
FIG. 2 is a control flowchart of a stationary vehicle control state.
Figure 3:
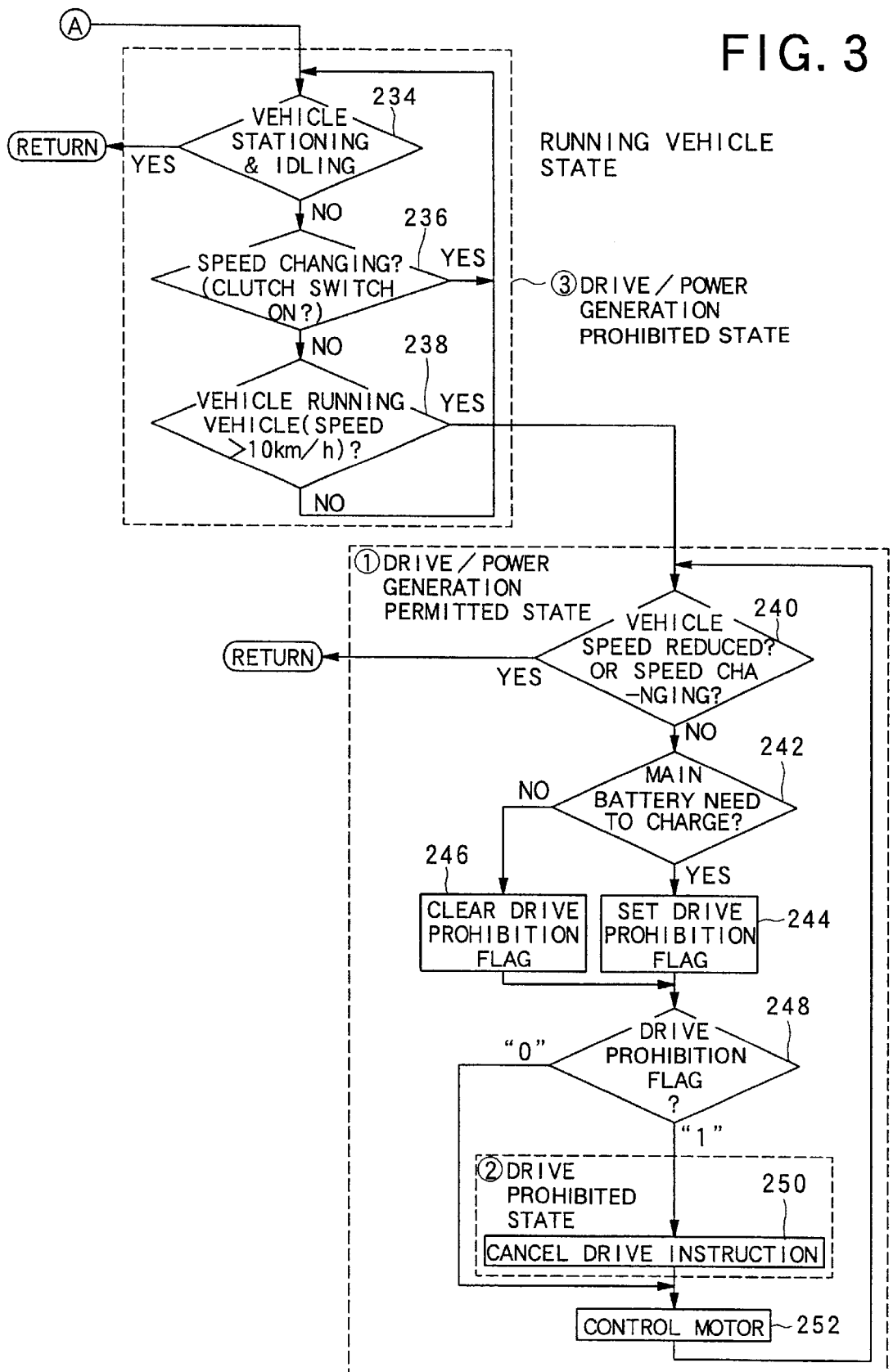
FIG. 3 is a control flowchart of a running vehicle control state.
Figure 4:
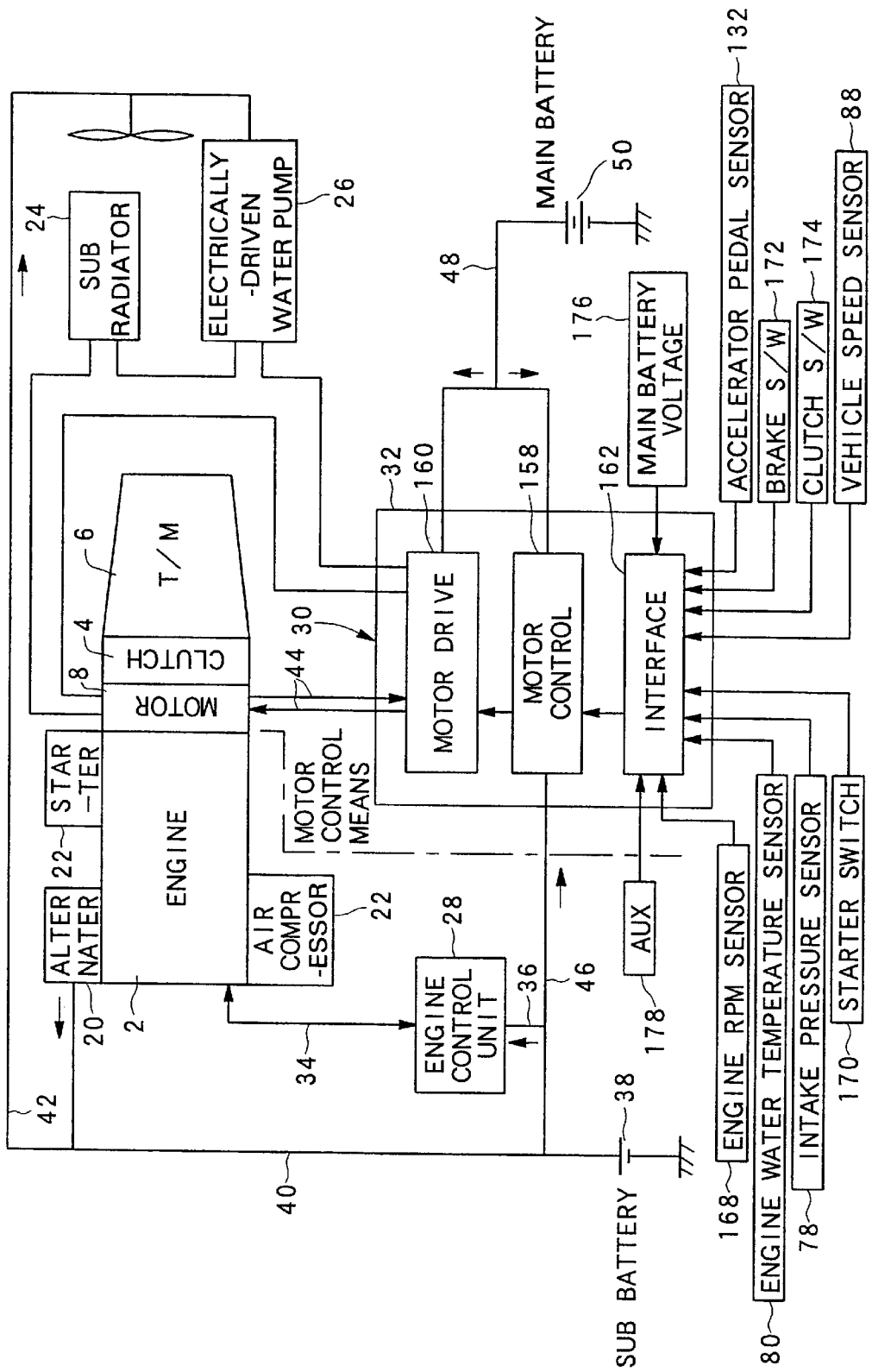
FIG. 4 is a diagram showing a vehicle system including the motor drive control apparatus.

The motor control means 32 controls the motor 8 as shown by the FIG. 2 and FIG. 3 flowcharts. As shown in FIG. 2, in the stationary vehicle control state of the vehicle, when the control is started (200), the motor control means 32 carries out initialization (202) and determines whether the engine 2 is starting (204).

When the determination (204) is YES, the motor control means 32 determines whether starting of the engine 2 has been finished (206). When the determination (206) is YES, the motor control means 32 returns to the determination (204). When the determination (206) is NO, the motor control means 32 controls to assist starting of the engine 2 by driving the motor 8 in accordance with the starting drive control state (208) and returns to the determination (206).

When the determination (204) is NO, the motor control means 32 determines whether the vehicle is running (210). When the determination (210) is YES, the motor control means 32 transits to the running vehicle control state as mentioned later. When the determination (210) is NO, the motor control means 32 determines whether idling is unstable (212).

When the determination (212) is YES, the motor control means 32 determines whether idling has been stabilized (214). When the determination (214) is YES, the motor control means 32 returns to the determination (212). When the determination (214) is NO, the motor control means 32 controls to stabilize idling of the engine 2 by driving the motor 8 in accordance with an idling stabilization control state (216) and returns to the determination (214).

When the determination (212) is NO, the motor control means 32 determines whether the vehicle has been started (218). When the determination (218) is YES, the motor control means 32 determines whether starting has been finished (220). When the determination (220) is YES, the motor control means 32 returns to the determination (218). When the determination (220) is NO, the motor control means 32 controls to assist starting of the vehicle by driving the motor 10 in accordance with a starting drive control state (222) and returns to the determination (220).

When the determination (218) is NO, the motor control means 32 determines whether the engine 2 is stalled (224). When the determination (224) is YES, the motor control means returns to the determination (204). When the determination (224) is NO, the motor control means 32 determines whether the engine 2 is in a cold state and water temperature is low (226).

When the determination (226) is NO, the motor control means 32 returns to the determination (204). When the determination (226) is YES, the motor control means 32 determines whether the main battery 50 needs to charge (228).

When the main battery 50 does not need to charge and the determination (228) is OK, the motor control means 32 returns to the determination (204). When the main battery 50 needs to charge and the determination (228) is NG, the motor control means 32 calculates a required amount of power generation (230), controls the motor 8 to generate electricity (232) and returns to the determination (204).

When in the determination (210), the vehicle is running and the determination is YES, the motor control means 32 transits to the running vehicle control state shown in FIG. 3 via the drive/power generation prohibited control state. In the drive/power generation prohibited control state, the motor control means 32 determines whether the vehicle is stationary and idling (234).

When the determination (234) is YES, the motor control means 32 returns to the determination (210) of the idling control state shown in FIG. 2. When the determination (234)

is NO, the motor control means 32 determines whether the clutch switch 174 is made ON (speed changing or neutral state) (236).

When the determination (236) is YES, the motor control means 32 returns to the determination (234). When the determination (236) is NO, the motor control means 32 determines whether the vehicle is running by a vehicle speed signal from the vehicle sensor 88 (238). For example, determination 210 may determine whether the vehicle speed is greater than 10 km/h.

When the determination (238) is NO, the motor control means 32 returns to the determination (234). When the determination (238) is YES, the motor control means 32 transmits to the drive/power generation permitted control state of the running vehicle control state and determines whether the vehicle speed is reducing or whether the clutch switch 174 is made ON (speed changing or neutral state) (240).

When the determination (240) is YES, the motor control means 32 returns to the determination (234). When the determination (240) is NO, the motor control means calculates an amount of motor driving or an amount of motor power generation (242) and determines drive instruction or power generation instruction. Further, the motor control means 32 determines whether the main battery 50 needs to charge (244).

When the main battery (50) needs to charge and the determination (244) is YES, the motor control means 32 sets a drive prohibition flag to "1" (246). When the main battery 50 does not need to charge and the determination (244) is NO, the motor control means 32 clears the drive prohibition flag to "0" (248).

Successively, the motor control means 32 determines whether the drive prohibition flag is "1" or "0" (250). When the determination (250) is "1", the motor control means 32 transits to the drive prohibited control state and when the result calculated at the processing (242) is the drive instruction, the motor control means 32 cancels the drive instruction of the motor 8 (252) and makes only the power generation instruction effective. When the determination (250) is "0", the motor control means 32 makes the result calculated at the processing (242) effective, controls the motor 8 in accordance with the effective drive instruction or power generation instruction (254) and returns to the determination (240).

In this way, according to the motor drive control apparatus 30, the drive state and the power generation state of the motor 8 having the drive function and the power generation function directly and connected to the engine 2, are controlled by the motor control means 32 based on the operating state of the engine 2 and the operating state of the vehicle independently from control of the engine 2 by the engine control means 28.

Further, the motor drive control apparatus 30 sets the idling power generation control state, the starting drive control state, the starting drive control state and the idling stabilization drive control state, controls to charge the main battery 50 by generating electricity by the motor 8 in the idling power generation control state, controls to assist to start the vehicle by driving the motor 8 in the starting drive control state, controls to assist to start the engine 2 by driving the motor 8 in the starting drive control state, and controls to stabilize idling of the engine 2 by driving the motor 8 in the idling stabilization drive control state.

According to the motor drive control apparatus 30, the motor 8 is controlled by the motor control means 32 to drive the motor 8 in cooperation with driving of the starter 22 and in accordance with the operating state of the engine 2 in starting the engine 2 as the processing (208) in FIG. 2 in the starting drive control state.

The motor control means 32 provides to set, as conditions of stopping the motor 8, at least two conditions: the main battery voltage Vb of the main battery 50 of the motor 8 is less than set voltage 3#Vb; and a drive time period Tm of the motor 8 exceeds a set time period #Tm. The motor control means 32 controls to stop driving of the motor 8 when at least one of the stopping conditions is established.

According to the embodiment, the motor control means 32 provides to set, as conditions of stopping the motor 8, the condition of the main battery voltage Vb of the main battery 50 of the motor 8 being less than the set voltage 3#Vb, the condition of the drive time period Tm of the motor 8 exceeds the set time period #Tm, a condition of an engine rotational number Ne of the engine 2 exceeds a set rotational number #Ne, a condition of vehicle speed SP of the vehicle exceeds set vehicle speed #SP, and a condition of the starter 22 being made to stop driving and controls to stop driving of the motor 8 when at least one of the stopping conditions is established.

Figure 9:
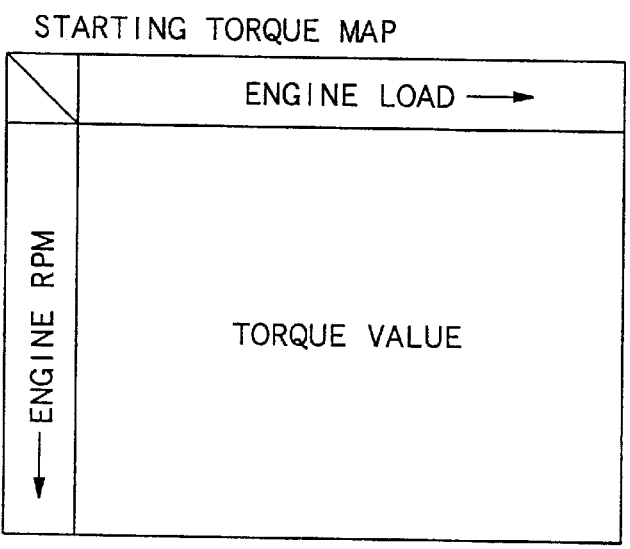
FIG. 9 is a diagram showing a starting torque map relating engine rotational number and engine load.

Further, as shown in FIG. 9, the motor control means 32 provides to set a starting torque map of the motor 2 by the engine rotational number Ne and engine load Le and controls to drive the motor 8 by a torque value searched from the starting torque map in cooperation with driving the starter 22 in starting the engine 2.

Next, an explanation will be given of the operation in reference to FIG. 1.

According to the motor drive control apparatus 30, in starting the engine 2, when the control is started (300), the motor control means 32 determines whether the vehicle speed SP is 0 (SP=0) as the condition of driving the motor 8 (302), determines whether the engine rotational number Ne is 0 (Ne=0) (304) and determines whether the starter switch 170 is made ON and the starter 22 is being driven (306).

When the determinations (302) through (306) are respectively NO, the motor control means 32 returns to the determination (302) (308). When all of the determinations (302) through (306) are YES, the motor control means 32 acquires a designated torque value from the starting torque map set by the engine rotational number Ne and the engine load Le (310) and drives the motor 8 by the acquired torque value (312).

In driving the motor 10, as conditions of stopping the motor 8, the motor control means 32 determines whether the main battery voltage Vb of the main battery 50 of the motor 8 is less than the set voltage #Vb (314), determines whether the drive time period Tm of the motor 10 exceeds the set time period #Tm (316), determines whether the engine rotational number Ne of the engine 2 exceeds the set rotational number #Ne (318), determines whether the vehicle speed SP of the vehicle exceeds the set vehicle speed #SP (320) and determines whether the starter switch 170 is made OFF and the starter 22 is made to stop driving (322).

When all of the determinations (314) through (322) are NO, the motor control means 32 returns to the determination (306). When the determinations (314) through (322) are respectively YES, the motor control means 32 stops to drive the motor 8 (324) and returns to the determination (302) (326).

In this way, the motor drive control apparatus 30 can, with the motor 8, always assist cranking operation of the starter 22 by controlling the drive of the motor 8 in cooperation with driving the starter 22 and in accordance with the operating state of the engine 2. Therefore, the motor drive control apparatus 30 can firmly assist the start of the engine 2 and can ensure a firm starting performance.

Further, according to the motor drive control apparatus 30, the whole load in cranking operation is not borne by the starter 22 but a portion thereof can be borne by the motor 8. Therefore, the motor drive control apparatus 30 can alleviate load on the starter 22 and can promote durability of the starter 22.

Further, the motor drive control apparatus 30 assists the cranking operation by necessarily driving the motor 8 in cooperation with driving the starter 22 in starting the engine 2 and accordingly, there is no need to add a function of determination, selection or the like to the assist conditions. Therefore, the motor drive control apparatus 30 can simplify control of the motor 8 and can promote reliability of the control of the motor 8.

Further, the motor drive control apparatus 30 sets, as the conditions of stopping the motor 8, the condition in which the main battery voltage Vb of the main battery 50 of the motor 10 is less than the set voltage 3#Vb and the condition in which the drive time period Tm of the motor 8 exceeds the set time period #Tm and controls to stop driving the motor 8 to thereby enable to restrain excess power consumption by the motor 8. Further, the engine 2 can also be started only by the starter 22 even when the motor 8 is made to stop driving depending on the state of the main battery 50 and can recover the charged state of the main battery 50 by charging the main battery 50 after starting the engine.

Further, although in the above-described embodiment, the motor cooperates in driving the starter 22, the starter 22 and the motor 8 can also be controlled to switch to drive during the cranking operation. For example, the starter 22 and the motor 8 can also be controlled such that over an initial stage to an intermediary stage of start of cranking operation, the cranking rotational number is swiftly increased by driving the starter 22 and thereafter, the starting operation is finished by driving the motor 8.

Further, the motor drive control apparatus 30 can prohibit to drive the motor 8 in the cranking operation in which the manual transmission 8 is brought into a runnable engaged state by providing to set a nonrunnable engaged state, for example, a neutral engaged state of the manual transmission 6 as a condition of permitting to drive the motor 8. Further, the motor drive control apparatus 30 can prohibit the drive of the motor 8 in the cranking operation in which an automatic transmission is brought into a runnable engaged state by providing to set a nonrunnable engaged state, for example, a neutral engaged state or a parking engaged state of the automatic transmission as a condition for permitting the drive of the motor 8.

In this way, the motor drive control apparatus according to the invention can always assist the cranking operation by the starter by the motor in starting the engine, further, can make the motor bear a portion of load in the cranking operation without making the starter bear the whole load. Further, the motor control drive apparatus assists the cranking operation by constantly driving the motor in cooperation with driving the starter in starting the engine and accordingly, there is no need of adding the function of determination, selection or the like of the assist conditions.

Therefore, the motor drive control apparatus can ensure firm starting performance of the engine by being capable of assisting the cranking operation of the starter always using the motor and can promote durability of the starter since a portion of the load during cranking can be borne by the motor. Further, the motor drive control apparatus can simplify control of the motor since there is no need of adding the function of determination, selection or the like of assist conditions and can promote the reliability of control of the motor.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. A motor drive control apparatus for vehicle including an electric motor having a driving function and a power generating function directly connected to an internal combustion engine, a main battery providing power to and receiving electrical power from said electric motor, a starter connected to the engine and powered by a sub-battery, said motor drive control apparatus comprising motor control means for controlling the electric motor in cooperation with driving of the starter and in accordance with an operating state of the engine, and wherein the motor drive control apparatus simultaneously drives the starter with the sub-battery and the electric motor with the main battery, wherein the motor control means for supplying a drive power to the motor includes at least two conditions for stopping the supply drive power to the motor, wherein the two conditions are as follows: (1) a main battery voltage of a main battery charged by power generated by the motor is less than a set voltage; and (2) a drive time period of the motor exceeds a set time period, said motor control means stopping drive power to the motor when at least one of the stopping conditions is established.

2. The motor drive control apparatus according to claim 1, wherein the motor control means includes further conditions for stopping the supply of drive power to the motor as follows: (1) an engine rotational number of the engine exceeds a set rotational number; (2) vehicle speed of the vehicle exceeds a set vehicle speed; and (3) the starter is stopped, said motor control means stopping drive power to the motor when at least one of the stopping conditions is established.

3. The motor drive control apparatus according to claim 1, wherein the motor control means requires a disengaged state for a transmission connected to the engine as a drive permitting condition to permit drive power to the electric motor.

4. The motor drive control apparatus according to claim 1, wherein the motor control means is provided for setting a starting torque map for the electric motor from an engine rotational number and an engine load and driving the motor using a torque value searched from the starting torque map in cooperation with driving the starter in starting the engine.

5. A vehicle including a starter connected to an internal combustion engine and powered by a sub-battery, a motor drive control apparatus including motor control means to control a driving function and a power generating function of an electric motor, the electric motor being directly connected to the engine and electrically connected to a main battery for providing power to and receiving electrical power from said electric motor, means for sensing a voltage condition of the main battery, the motor control means permitting operation of the electric motor when the voltage condition of the main battery is sufficient to drive the motor, and a clutch switch for detecting if the vehicle transmission is in an engaged condition, the motor control means operating the electric motor and the starter when the starter switch is on, and the voltage and transmission conditions are met, the means for sensing a voltage condition of the main battery sensing battery voltage for discontinuing operation of the electric motor if the main battery voltage drops to a predetermined voltage;

an engine rotational speed sensor for discontinuing operation of the electric motor when engine rotational speed is greater than a predetermined engine rotational speed;

a vehicle speed sensor for discontinuing operation of the electric motor when vehicle speed is greater than a predetermined vehicle speed, and starter switch sensing means for discontinuing operation of the electric motor when the starter switch is turned off.

6. The vehicle of claim 5, including timing means for discontinuing operation of the electric motor when a continuous drive time for the electric motor exceeds a predetermined time.

7. The vehicle of claim 5, wherein the motor drive control apparatus simultaneously drives the starter with the sub-battery and the electric motor with the main battery.

8. The vehicle of claim 5, including a load sensor for measuring engine load, wherein the motor control means selects a value from a starting torque map in response to the engine rotational speed and the engine load to control the amount of energization of the electric motor by the main battery depending on the selected value.

9. A method of controlling a starter and an electric motor for assisting the starter to start a vehicle, the starter being connected to an engine and powered by a sub-battery, the electric motor connected to the engine and having a driving function and a power generating function, and a main battery for providing power to and receiving electrical power from the electric motor, the method comprising the steps of:

sensing actuation of the starter switch to enable operation of the starter and the electric motor;

driving the electric motor and the starter in response to actuation of the starter switch;

sensing main battery voltage and stopping the electric motor when the sensed battery voltage is less than a predetermined voltage;

sensing time of operation of the electric motor and stopping the electric motor when the electric motor operates for a predetermined time;

sensing engine rotational speed and stopping the electric motor when the engine rotational speed exceeds a predetermined rotational speed;

sensing vehicle speed and stopping the electric motor when the vehicle speed exceeds a predetermined vehicle speed; and sensing the position of the starter switch and stopping the electric motor when the starter switch is off, wherein the electric motor assists the starter in starting the engine so that life of the starter is increased.

10. The method of claim 9, including the steps of:

sensing voltage of the main battery and preventing operation of the electric motor until a voltage condition of the main battery is sufficient to power the motor without damage to the main battery, and sensing a clutch condition of a clutch of the vehicle and preventing operation of the electric motor when the clutch is engaged, wherein only the starter starts the vehicle until the voltage condition and the clutch condition are satisfied.

11. The method of claim 9, including the steps of:

sensing vehicle speed before operation of the electric motor and preventing operation thereof until vehicle speed is zero, and sensing engine rotational speed before operation of the electric motor and preventing operation thereof until rotational speed is zero.

12. The method of claim 9, wherein the starter and the electric motor are operated simultaneously to start the vehicle.

13. The method of claim 9, including the steps of:

measuring engine load, and selecting a value from a starting torque map in response to the engine rotational speed and the engine load, wherein the amount of energization of the electric motor by the main battery depends on the selected value.

14. A vehicle including a starter connected to an internal combustion engine and powered by a sub-battery;

an electric motor directly connected to the engine;

a motor drive control apparatus including a motor controller for controlling a driving function and a power generating function of said electric motor;

a main battery electrically connected to said electric motor for providing power to and receiving electrical power from said electric motor, circuitry configured to sense a main battery voltage of said main battery, said motor controller enabling operation of said electric motor when the voltage of said main battery is sufficient to drive said motor;

a clutch switch for detecting when a vehicle transmission is in an engaged condition;

an engine rotational speed sensor for discontinuing operation of said electric motor when engine rotational speed is greater than a predetermined engine rotational speed;

a vehicle speed sensor for discontinuing operation of said electric motor when vehicle speed is greater than a predetermined vehicle speed, and a starter switch sensor for discontinuing operation of said electric motor when said starter switch is turned off, wherein said motor controller operates said electric motor and said starter when 1) said starter switch is on, 2) the main battery voltage exceeds a minimum voltage, and 3) the transmission is in an engaged condition, said circuitry being configured to discontinue operation of said electric motor when the main battery voltage drops to less than a predetermined voltage.

15. The vehicle of claim 14, including a timer for discontinuing operation of said electric motor when a continuous drive time for said electric motor exceeds a predetermined time.

16. The vehicle of claim 14, wherein said motor drive control apparatus simultaneously drives said starter with said sub-battery and said electric motor with said main battery.

* * * * *